United States Patent [19]

Henry et al.

[11] 3,770,572

[45] Nov. 6, 1973

[54] BLENDS OF A HYDROLYZED ETHYLENE/ACRYLATE COPOLYMER AND AN ELASTOMERIC POLYMER

[76] Inventors: Raymond M. Henry, 9417 Hadley, Overland Park, Kans.; Charles F. Feldman, c/o Gulf Oil Company, P.O. Box 2100, Conroe, Tex. 77001

[22] Filed: Oct. 4, 1971

[21] Appl. No.: 186,471

Related U.S. Application Data

[63] Continuation of Ser. No. 865,522, Oct. 10, 1969, abandoned, which is a continuation-in-part of Ser. Nos. 710,304, March 11, 1968, abandoned, and Ser. No. 331,941, Dec. 19, 1963, abandoned.

[52] U.S. Cl.................. 161/217, 161/216, 161/220, 117/132 C, 117/132 CB, 117/155 UA, 260/29.6 XA, 260/29.6 RW, 260/29.7 W, 260/4, 260/897 B, 260/889
[51] Int. Cl............................................ C08t 37/18

[58] Field of Search...................... 260/889, 897, 4, 260/29.6 RW, 29.6 XA, 29.7 W; 161/217

[56] References Cited
UNITED STATES PATENTS

| | | | |
|---|---|---|---|
| 3,485,785 | 12/1969 | Anspon et al...................... | 260/29.6 |
| 3,454,676 | 7/1969 | Busse................................ | 260/897 |

FOREIGN PATENTS OR APPLICATIONS 870,994  6/1961  Great Britain

*Primary Examiner*—Murray Tillman
*Assistant Examiner*—C. J. Seccuro
*Attorney*—Howard F. Vandenburgh

[57] ABSTRACT

Blended compositions comprising a hydrolyzed ethylene/acrylate polymer and an elastomeric polymer are prepared and the blended compositions employed as adhesives in the preparation of laminated structures.

18 Claims, No Drawings

BLENDS OF A HYDROLYZED ETHYLENE/ACRYLATE COPOLYMER AND AN ELASTOMERIC POLYMER

CROSS-REFERENCE OF RELATED APPLICATIONS

This application is a continuation of application Ser. No. 865,522, which in turn is a continuation in part of application Ser. No. 710,304 filed Mar. 11, 1968, and application Ser. No. 331,941 filed Dec. 19, 1963, all now abandoned.

This invention relates to the bonding of laminated structures. More particularly, this invention relates to improvement of wet tack, final bond strength and barrier properties in manufacturing laminates of metal foils and fibrous webs.

The laminating of sheets of aluminum foil and paper of rather small, fixed size is comparatively easy. Thermoplastic adhesives may be applied in the form of films or fluid dispersions and the assembled laminae may then be bonded in a laminating press with heated platens. The size of the finished structure is, of course, limited by the size of the laminating press. If it is desired, for example, to produce continuously an aluminum foil-paper laminate, several problems present themselves. The most desirable type of adhesive for the purpose is an aqueous dispersion of a viscosity which is easily coated at high speed. Use of water as the fluid base eliminates hazards and expense involved in evaporation of solvents. The adhesive substance carried by the water desirably should be one which will form a strong adhesive bond upon heating. As continuous application of external pressure during heating of a moving laminated structure is difficult to manage, the adhesive dispersion should be capable of holding the laminae together while wet. This property is referred to as "wet tack".

A reasonably good combination of final bond strength and wet tack has been obtained in the past with a combination of a buffered proteinaceous glue dispersion and a chloroprene polymer latex. Although final bond strength and barrier properties have left much to be desired, this type of composition has been employed commercially for several years.

Metal foils such as those manufactured by continuous processes always contain a small number of very small perforations, commonly referred to as "pinholes". Paper-foil laminates which are used to form impervious packages occasionally leak as a consequence. A desirable characteristic of laminating adhesives is the ability to seal pinholes in the foil. In this respect prior art adhesives have been deficient. For impervious packages it has been necessary to laminate an impervious plastic film between the paper and the foil.

It has been discovered that certain aqueous dispersions of ethylene copolymers are effective laminating adhesives, making a strong adhesive bond between metal foil and a fibrous web and at the same time sealing minute perforations in the foil and imparting good barrier properties to the laminate. However, when continuous lamination of foil to paper is attempted with these adhesives, it is found that the wet tack of the adhesive layer is insufficient to withstand the vibration and uneven tension which accompany the drying of the continously moving assembly of laminae. These polymer dispersions, furthermore, are incompatible with many ingredients of conventional laminating adhesives, so that preparation of satisfactory adhesive formulations is difficult.

We have now discovered that desirable wet tack, final bond strength and barrier properties are obtained when a metal foil is laminated to a fibrous web, employing as the laminating adhesive an aqueous dispersion of a mixture comprising particles of 1. a polymer of ethylene containing therein recurring units represented by the following structures:

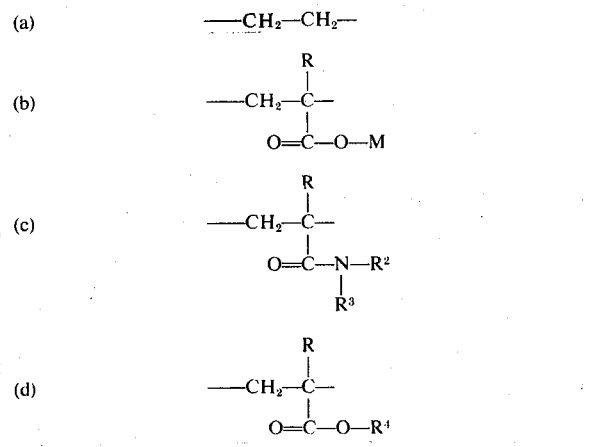

wherein R is selected from hydrogen and alkyl substituents, M is selected from the group consisting of hydrogen and cations, $R^2$ and $R^3$ are independently selected from the group consisting of hydrogen, hydroxy-alkyl and hydrocarbon groups with the further provision that $R^2$ and $R^3$ may be combined with N in a heterocyclic group, and $R^4$ is a hydrocarbon group, said groups of the formulas (b), (c) and (d) being present in a ratio of from about 0.01 to about 0.50 mol per mol of group (a), and 2. from about 20 to about 90 percent by weight of total polymer solids of an elastomeric polymer of at least one monomer selected from the group consisting of isobutylene, butadiene, chloroprene and isoprene.

A reasonable explanation of the functioning of the novel aqueous dispersion as a laminating adhesive is as follows: Upon application of the dispersion between the fibrous web and the metal foil, some of the water migrates into the web immediately and the dispersed particles of the tacky elastomer bridge the gap between the web and the foil in enough places to form a temporary bond. Upon heating, the water is driven off and the particles of the polymer of ethylene coalesce, soften, perhaps dissolve at least a part of the elastomer, and wet the surfaces of both the foil and the web. On cooling the polymer of ethylene solidifies and forms a strong bond and a barrier to both moisture and water vapor. A minimum proportion of the elastomer is required to obtain any significant improvement in wet tack and conversely, a certain minimum proportion of the ethylene polymer is required to obtain strength in the final adhesive bond, as well as good barrier properties. It is interesting that the mixed dispersions have lower viscosity than the component dispersions of either polymer. It is also true that the wet tack of the mixture is greater than that of either corresponding pure dispersion. The wet tack of corresponding pure dispersions of both polymers is rather poor and almost identical. These facts seem to suggest that some sort of interaction occurs between the two polymers, but the phenomenon remains unexplained.

So that the practice of this invention may be more easily understood, the following discussion is presented, with several specific examples included for illustrative purposes only.

DISPERSIONS OF POLYMERS OF ETHYLENE

The preferred type of aqueous dispersion of a polymer of ethylene is one in which the polymer possesses both good adhesive bonding and moisture barrier properties, and which requires no emulsifier or other surface active agent to obtain a dispersion, It is very desirable to practice the present invention without adding to the aqueous polymer dispersions any emulsifiers, buffering agents, water repellents or other additives. It is literally true that adding a chemically reactive or surface active component to a composition of this type can create more problems than are solved. The simplicity of the formulations used in the practice of this invention is to a large extent responsible for good final bond strength, both wet and dry, as well as the absence of corrosion of the foil and discoloration and tendering of the fibrous web, which often occur with the use of prior art laminating adhesives. Following are several procedures by which suitable ethylene polymer dispersions may be prepared.

A. An aqueous dispersion of an ethylene polymer made by copolymerization of ethylene with 20 percent methyl acrylate is prepared by heating in a stirred autoclave at 240° C. for 6 hours a mixture of the following: Ethylene polymer, 20 lb.; water, 90 lb.; 28 percent aqueous ammonium hydroxide, 12 lb.; sodium hydroxide, 300 grams. Upon cooling the resulting dispersion is ready for mixing with a suitable elastomer latex.

B. An aqueous dispersion of an ethylene polymer made by copolymerization of ethylene with 20 percent by weight of methyl acrylate is prepared by heating in a stirred autoclave at 240° C. for 6 hours a mixture of the following: Ethylene polymer, 22 lb.; water, 90 lb.; potassium hydroxide, 1,320 grams. Upon cooling and withdrawal from the reactor the resulting dispersion is ready for use.

C. An aqueous dispersion of an ethylene polymer made by copolymerization of ethylene with 22 to 23 percent by weight methyl acrylate is prepared by heating in a stirred autoclave at 240° C. for 6 hours a mixture of the following: Ethylene polymer, 20 lb.; water, 90 lb.; 28 percent aqueous ammonium hydroxide, 12 lb.; sodium hydroxide, 300 grams. The resulting dispersion normally contains 16 per cent solids. If desired, water may be evaporated to increase the solids content to 25 percent or higher.

D. An ethylene polymer made by copolymerization of ethylene with 40 to 50 percent methyl acrylate is dispersed in water according to the following procedure: In a stirred autoclave there is heated at 230° C. for 8 hours a mixture of ethylene polymer, 5.0 parts by weight; sodium hydroxide, 1.05 parts by weight; and water, 25 parts by weight. The resulting product mixture is cooled and filtered to yield as filtrate a stable aqueous dispersion of polymer.

E. An ethylene polymer made by copolymerization of ethylene with 20 percent methyl acrylate is converted to a stable aqueous dispersion by the following procedure: In a stirred autoclave there is heated for 8 HOURS AT 240° C. a mixture of ethylene polymer, 20 pounds; potassium hydroxide, 420 grams; 28 percent aqueous ammonium hydroxide, 12 lb.; and water, 90 lb. The product is cooled and any solid residue therein is removed by filtration.

F. An ethylene polymer made by copolymerization of ethylene with between 40 and 50 percent methyl acrylate is converted to a stable aqueous dispersion by the following procedure: In a stirred autoclave there is heated for 8 hours at 230 C. a mixture of ethylene polymer, 5.0 parts by weight; sodium hydroxide, 0.7 parts by weight; and water, 25 parts by weight. The reaction mixture is cooled and any solid residue is removed by filtration.

G. An ethylene polymer made by copolymerization of ethylene with 12.8 percent methyl acrylate is dispersed in water by heating in a stirred autoclave at 250° C. for 6 hours the following mixture: Ethylene polymer, 350 parts by weight; sodium hydroxide, 10.4 parts by weight; water, 900 parts by weight; and 28 percent aqueous ammonium hydroxide, 700 parts by weight. After cooling the resulting dispersion is ready for use.

H. An ethylene polymer made by copolymerization of ethylene with 20 per cent methyl acrylate is converted to a stable aqueous dispersion according to the following procedure: The following mixture is heated for 3 hours at 180° C. and for 3 hours at 230° C. in a stirred autoclave: Ethylene polymer, 200 parts by weight; water, 600 parts by weight; choline, 200 parts by weight; and 28 percent aqueous ammonium hydroxide, 600 parts by weight. A stable dispersion is formed which has a light yellow color.

The dispersions formed according to the above procedures have the milky appearance of oil-in-water emulsions. However, since the dispersion phase is actually solid, rather than liquid, they are not emulsions, according to the strictest definition of the term. The dispersions made according to the above procedures are quite stable and are suitable for combination with the dispersions of elastomeric polymers described below.

DISPERSIONS OF ELASTOMERIC POLYMERS

Suitable dispersions of elastomers are prepared most conveniently by dissolving or peptizing the elastomer in a solvent such as a low-boiling hydrocarbon or chlorinated hydrocarbon, emulsifying the resulting solution in water, and then evaporating the solvent to yield a stable latex. It is also feasible to make suitable latexes by emulsion polymerization. It is always advisable, however, to keep the concentration of polymerization catalyst residues, emulsifiers and other substances to a minimum.

In general, the elastomeric polymers of isobutylene, butadiene, chloroprene, and isoprene yield the greatest improvement of wet tack, consistent with high final bond strength and barrier properties of the laminate. The most readily available elastomeric polymers of butadiene are the butadiene-styrene copolymers, of which it is preferred to use only those containing at least 50 mole percent butadiene. The butadiene-acrylonitrile elastomeric copolymers also may be used. Natural rubber and cis-1,4-polyisoprene are useful. However, some yellowing of the paper with age is observed with natural rubber. Polychloroprene (neoprene) latex may also be used in the method and composition of this invention, although with this elastomer some yellowing of the laminate with age may also be observed. In laminating paper to many shades of dyed anodized aluminum, color changes which occur on aging are of no importance.

TEST PROCEDURES

Below are described suitable procedures for evaluation of the various characteristics which are important in an aqueous dispersion type of metal-to-paper laminating adhesive.

WET "TACK" TEST PROCEDURE

The adhesive composition to be evaluated is spread as a thin film on a 1 in. × 6 in. strip of .0007 in. thick degreased aluminum foil. The coated side of the foil is then pressed by hand against a piece of 40 lb. unbleached kraft paper held firmly in a vertical position. The aluminum foil immediately peeled off the paper in an upward direction at 180°. The peel test is carried out using a machine which gives a constant separation speed of 12 inches per minute. The machine is also equipped with a spring gauge which measures the force necessary to separate the two plies. An adhesive system possessing good wet tack will cause a deep, even paper fiber tear when subjected to this test.

LABORATORY PREPARATION OF ALUMINUM FOIL-PAPER LAMINATE

The adhesive is applied to a 8 in. × 11 in. sheet of 0.001 in. thick heat treated aluminum foil at a coating weight of two to three lbs./ 3,000 sq. ft. Then a 9 in. × 11 in. sheet of 40 lb. bleached kraft coating stock is placed over the foil and laminated to the foil by use of a hand roller. The laminate is then dried for two to three minutes at 140° to 150° C. and cooled to room temperature. Laminates may also be dried at room temperature overnight.

DRY ADHESION TEST

Strips (1 in. × 6 in.) of the cured and dried aluminum foil-paper laminate are delaminated by peeling the aluminum from the paper at 180° using the machine described under the wet tack test. The delamination should occur by 100 percent paper failure. The adhesive is considered unsatisfactory if delamination occurs between the paper and aluminum foil without paper fiber tear.

WET ADHESION TEST

Strips (1 in. × 6 in.) of the cured and dried aluminum foil-paper laminates are soaked in tap water for five minutes. The laminate is separated by peeling back the foil at 180° by hand. The adhesive side of the aluminum foil is then rubbed vigorously with the finger in an effort to remove the adhesive layer. The degree of resistance of the adhesive to removal is rated good, fair, or poor.

TEST OF MOISTURE VAPOR TRANSMISSION OF LAMINATES

Moisture vapor transmission, expressed as grams per square meter per 24 hr. day, is measured at 78° F. (25.6° C.) under the moisture vapor differential produced by maintaining 50 per cent relative humidity on one side of the laminate and zero per cent relative humidity in the atmosphere in contact with the other side. The procedure is a modification of TAPPI Standard T 448 m-49, the modification consisting essentially in use of a temperature of 78° F. instead of 73° F. The test method referred to may be used without modification, if desired, the use of the higher temperature being primarily a matter of convenience.

EXAMPLE 1

Several aqueous dispersions were prepared, employing a dispersion of a polymer of ethylene containing approximately 25 percent solids made by procedure A above, in combination with a butyl rubber (copolymer of isobutylene with about 3 percent isoprene) latex containing approximately 61 percent total solids. The two polymer dispersions were mixed together and the viscosity of the mixture was determined. Wet tack in aluminum foil-paper lamination was evaluated manually as follows: A degreased strip of aluminum foil one inch wide was coated with the aqueous dispersion, was pressed against a sheet of 40 lb. unbleached kraft paper and was immediately peeled off at an angle of 180° using a calibrated spring gauge to measure the peel strength. Samples exhibiting good peel strength caused tearing of paper fibers. Results are tabulated below:

| Percent butyl latex | Viscosity (cps) | Wet peel (g./inch) | Comments |
| --- | --- | --- | --- |
| 0 | 820 | 60 | No paper fiber tear. |
| 5 | 324 | 80 | Slight paper fiber tear. |
| 10 | 180 | 140 | Deep, even paper fiber tear. |
| 15 | 140 | 150 | Do. |
| 20 | 110 | 150 | Do. |
| 25 | 106 | 150 | Do. |
| 50 | ............. | 170 | Do. |
| 100 | 714 | 80 | No paper fiber tear. |

Beneficial results are apparent in aqueous dispersions containing from 10 percent butyl latex (about 21 percent by weight elastomer based on total polymer solids) to 50 percent butyl latex (about 70 percent by weight elastomer based on total polymer solids). Compositions were also prepared in which the elastomer content exceeded 70 per cent by weight of total solids. Wet tack and dry bond strength were good but wet bond strength was unsatisfactory. At 100 percent elastomer content, neither wet peel strength nor final bond strength was satisfactory. Optimum results appeared to be achieved at about 30 percent by weight elastomer based on weight of total polymer solids.

EXAMPLE 2

In order to evaluate the effect of total solids concentration, as well as relative proportions of ethylene polymer and elastomer in the laminating adhesives, a series of compositions was prepared, employing the ethylene dispersion made according to Procedure A and the butyl rubber dispersion of Example 1. The adhesive formulations were diluted with water to lower total solids content, where desired. The test methods given above were used to obtain the tabulated data:

| Percent total solids | Percent butyl rubber in solids | Viscosity at room temp. (cps) | Wet tack test | Dry adhesion | Wet adhesion |
|---|---|---|---|---|---|
| 25.0 | 0 | 418.0 | No paper tear | 100% paper failure | Good. |
| 25.0 | 10 | 24.1 | ....do.... | ....do.... | Do. |
| 25.0 | 25 | 8.5 | Deep paper tear | ....do.... | Do. |
| 25.0 | 50 | 6.5 | ....do.... | ....do.... | Do. |
| 25.0 | 75 | 7.0 | ....do.... | ....do.... | Poor. |
| 25.0 | 90 | 61.0 | ....do.... | No paper failure | Bond failed in water. |
| 25.0 | 100 | 66.0 | No paper tear | ....do.... | Do. |
| 25.0 | 0 | 418 | ....do.... | 100% paper failure | Good. |
| 28.8 | 22.8 | 151 | ....do.... | ....do.... | Do. |
| 34.4 | 44.5 | 66 | Deep paper tear | ....do.... | Do. |

| Percent total solids | Percent butyl rubber in solids | Viscosity at room temp. (cps) | Wet tack test | Dry adhesion | Wet adhesion |
|---|---|---|---|---|---|
| 43.9 | 71.4 | 112 | Deep paper tear | 100% paper failure | Fair. |
| 53.3 | 88.4 | 149 | ....do.... | ....do.... | Do. |
| 59.0 | 95.0 | 100 | ....do.... | No paper tear | Bond failed in water. |
| 62.8 | 100.0 | 112 | No paper tear | ....do.... | Do. |

It will be seen that at about 25 per cent total solids content, optimum results are achieved at a level of 20 to 50 per cent butyl rubber based on total solids. As the total polymer solids content is increased over the range of about 30 to 55 percent, best results are obtained when the butyl rubber content is also increased over the range of from about 45 to 90 percent of total polymer solids.

EXAMPLE 3

Several aqueous dispersions were prepared by mixing an ethylene polymer dispersion prepared according to procedure A and a neoprene (polychloroprene) latex.

It will be seen from the data that best results are obtainable between about 30 and 55 percent total polymer solids concentration and about 45 to 90 percent polychloroprene based on total polymer solids.

EXAMPLE 4

A series of aqueous dispersions was prepared as in Example 3, with the exception that natural rubber (Hevea) latex was employed as the elastomeric polymer dispersion. The data tabulated below show the effect of total polymer solids and elastomer content on adhesive property.

| Percent total solids | Percent natural rubber in solids | Viscosity at room temp. (cps) | Wet tack test | Dry adhesion | Wet adhesion |
|---|---|---|---|---|---|
| 25.0 | 0 | 335 | No paper tear | 100% paper tear | Good. |
| 28.8 | 21.9 | 79 | ....do.... | ....do.... | Do. |
| 34.4 | 45.6 | 50 | Slight paper tear | ....do.... | Do. |
| 43.9 | 71.5 | 160 | Deep paper tear | 100% paper tear | Poor. |
| 53.3 | 88.5 | (*) | Slight paper tear | ....do.... | Do. |
| 59.0 | 95.7 | (*) | ....do.... | ....do.... | Do. |
| 62.7 | 100 | 110 | No paper tear | No paper tear | Poor. |

* Thickened rapidly upon mixing.

The data tabulated below show the effect of total solids content and proportion of ethylene polymer and neoprene in the solids content.

Best results are obtained with this type of formulation at about 35 to 40 percent total polymer solids, of which the elastomer content is about 45 to 60 percent.

| Percent total solids | Percent polychloroprene in solids | Viscosity at room temp. (cps) | Wet tack test | Dry adhesion | Wet adhesion |
|---|---|---|---|---|---|
| 25.0 | 0 | 335 | No paper tear | 100% paper failure | Good. |
| 28.5 | 21.0 | 90 | ....do.... | ....do.... | Do. |
| 32.7 | 45.8 | 59 | Deep paper tear | ....do.... | Do. |
| 42.5 | 70.6 | (*) | ....do.... | ....do.... | Do. |
| 51.2 | 87.9 | (*) | ....do.... | ....do.... | Do. |
| 56.5 | 95.6 | 136 | No paper tear | ....do.... | Fair. |
| 60.0 | 100 | 226 | ....do.... | ....do.... | Poor. |

* Thickened very rapidly upon mixing.

| Percent total solids | Percent butadiene/acrylonitrile[1] in solids | Wet tack test | Dry adhesion | Wet adhesion |
|---|---|---|---|---|
| 25.0 | 0 | No paper tear | 100% paper tear | Good. |
| 26.6 | 15.4 | ........do | ............do | Do. |
| 30.1 | 26.6 | Deep paper tear | ............do | Do. |
| 33.2 | 62.3 | ........do | ............do | Fair. |
| 37.3 | 83.4 | ........do | Slight paper tear | Delaminated in water. |
| 39.8 | 93.7 | ........do | No paper tear | Do. |
| 41.5 | 100 | No paper tear | ............do | Do. |

[1] 55% butadiene, 45% acrylonitrile as 41.5% solids latex.

EXAMPLE 5

Several dispersions were prepared as in Example 3, with the exception that a 50 percent butadiene-50 percent styrene copolymer latex was employed as the elastomer dispersion. The data tabulated below demonstrate the effect of total solids and elastomer content on the properties of the adhesive dispersion.

| Percent total solids | Percent butadiene/styrene[1] in solids | Viscosity at room temp. (cps) | Wet tack test | Dry adhesion | Wet adhesion |
|---|---|---|---|---|---|
| 25.0 | 0 | 3,840 | No paper tear | 100% paper failure | Good. |
| 26.7 | 15.7 | 254 | Deep paper tear | ............do | Do. |
| 29.4 | 36.3 | 64 | ........do | ............do | Do. |
| 33.9 | 63.1 | 237 | ........do | ............do | Do. |
| 38.3 | 83.8 | 6,090 | ........do | ............do | Do. |
| 41.0 | 93.9 | 3,700 | ........do | ............do | Fair. |
| 42.8 | 100.0 | 76 | No paper tear | No paper failure | Delaminated in water. |

[1] 50% styrene, 50% butadiene as 42.8% solids latex.

Best results are obtainable with this type of formulation at about 25 to 40 percent total polymer solids, of which from about 15 to 85 percent is 50 percent butadiene-50 percent styrene copolymer elastomer.

EXAMPLE 6

A series of dispersions was prepared as in Example 5 with the exception that a 30 percent butadiene-70 percent styrene copolymer latex was employed as the elastomer dispersion. The dispersions possessed high viscosity and showed good wet tack over a rather narrow range of total solids and elastomer content. Data are tabulated below.

| Percent total solids | Percent butadiene/styrene[1] in solids | Viscosity at room temp. (cps) | Wet tack test | Dry adhesion | Wet adhesion |
|---|---|---|---|---|---|
| 25.0 | 0 | 3,840 | No paper tear | 100% paper failure | Good. |
| 26.8 | 16.0 | 3,840 | ......do | ............do | Do. |
| 29.4 | 36.4 | 3,840 | ......do | 100% paper failure | Good. |
| 33.9 | 63.1 | 3,840 | Slight paper tear | ............do | Do. |
| 38.2 | 83.7 | 3,840 | No paper tear | ............do | Do. |
| 40.9 | 93.9 | 3,840 | ......do | No paper failure | Delaminated in water. |
| 42.7 | 100 | 3,840 | ......do | ......do | do |

[1] 70% styrene, 30% butadiene as 42.7% solids latex.

EXAMPLE 7

Several aqueous dispersions were prepared as in Example 6 with the exception that a 55 percent butadiene-45 percent acrylonitrile copolymer latex was employed as the elastomer dispersion. Adhesive properties are tabulated below.

The optimum results with respect to all of the properties tested are obtained with formulations of this type at a total polymer solids content of about 30 to 35 percent and about 25 to 65 percent butadiene-acrylonitrile copolymer elastomer based on total polymer solids.

EXAMPLE 8

Several aqueous dispersions were prepared as in Example 7 with the exception that a 67 percent butadiene-33 percent acrylonitrile copolymer latex was employed as the elastomer dispersion. The characteristics of the adhesive formulations ae indicated by the test data tabulated below.

| Percent total solids | Percent butadiene/acrylonitrile[1] in solids | Wet tack test | Dry adhesion | Wet adhesion |
|---|---|---|---|---|
| 25.0 | 0 | No paper tear | | |
| 26.7 | 15.7 | ........do | | |
| 29.3 | 36.2 | ........do | | |
| 33.7 | 62.9 | ........do | | |
| 38.1 | 83.7 | ........do | | |
| 40.7 | 93.8 | Deep paper tear | | |
| 42.5 | 100 | No paper tear | | |

[1] 67% butadiene, 33% acrylonitrile copolymer as 42.5% solids latex.

This example illustrates a certain lack of predictability in the performance of butadiene-acrylonitrile copolymers. Formulations made with this class of copolymers may possess good and even outstanding wet tack and satisfactory dry adhesion. However, attempts to alter or adjust the ratio of components of such formulations are likely to produce disappointing results.

EXAMPLE 9

Mixtures of varying proportions of an ethylene polymer dispersion prepared according to procedure A and a butyl rubber latex were prepared and the solids content of all the mixtures was then adjusted to 24 percent. These mixtures were then used to coat 40 lb. bleached kraft paper stock at two different coat weights. The moisture vapor transmission rates were then determined. A commercial paper-to-foil laminating adhesive of the proteinaceous dispersion type was also coated and tested for purposes of comparison. The results are tabulated below.

MVTR'S of Paper Coated With Blends of Ethylene Polymer Dispersion and Butyl Rubber

| Percent ethylene polymer at 25 percent solids | Percent butyl rubber at 25 percent solids | Coat weight (lb./3000 ft.$^2$) | MVTR'S (g./m$^2$/24 hrs.) Uncreased | Creased |
|---|---|---|---|---|
| 0 | 100 | 4.4 | 50.7 | 75.9 |
| 0 | 100 | 11.9 | 24.4 | 20.3 |
| 10 | 90 | 5.2 | 15.4 | 23.3 |
| 10 | 90 | 7.9 | 9.0 | ............... |
| 25 | 75 | 4.8 | 25.8 | 32.2 |
| 25 | 75 | 10.3 | 7.4 | 7.6 |
| 50 | 50 | 3.9 | 24.4 | 24.7 |
| 50 | 50 | 6.8 | 13.3 | 12.3 |
| 75 | 25 | 4.2 | 29.2 | 31.5 |
| 75 | 25 | 7.8 | 12.9 | 13.0 |
| 90 | 10 | 3.9 | 20.3 | 20.7 |
| 90 | 10 | 6.3 | 17.8 | 14.6 |
| 100 | 0 | 4.7 | 26.5 | 29.0 |
| 100 | 0 | 7.5 | 17.2 | 17.5 |
| Commercial adhesive................... | | 4.4 | 91.1 | 82.6 |
| Do..................................... | | 7.8 | 66.4 | 39.6 |
| Paper control ............................ (uncoated 40 lb. bleached kraft). | | 0 | 297.7 | 291.9 | the type exemplified above but with a very low initial viscosity, so as to make increases in viscosity more readily apparent. Initially the polymers were added to the formulation as 5 percent aqueous solutions at concentrations of 0.1, 0.5, and 1.0 percent by weight. Among the thickening agents evaluated were various grades of polyvinyl alcohol, carboxymethyl cellulose, hydroxypropyl methyl cellulose, and carboxymethyl hydroxyethyl cellulose, as well as polyvinyl pyrrolidone. Viscosity determinations of the more stable formulations are shown in the table below. Although all produced a thickening effect, the cellulose derivatives caused the formulation to cream or gel. The polyvinyl alcohols and the polyvinyl pyrrolidone were perfectly compatible for the length of the test (3 days). Each solution was diluted with the necessary amount of water to keep the adhesive polymer solids content constant throughout the experiment. The results shown in the table below are therefore indicative of relative effectiveness.

It can be seen from the tabulated results that the viscosity drop which occurs on mixing of the ethylene polymer dispersion with the elastomer latex may be easily overcome by use of water soluble thickening agents. Furthermore, by this means both total solids content and viscosity may be easily adjusted over a wide range so as to be suitable for various paper stocks, coating weights, and coating machine speeds. The quality of the adhesive bond is in general unaffected by the presence of small amounts of water soluble polymer thickening agents.

Effect of Water Soluble Thickening Agents on the Viscosity of Adhesive Formulation

| | | Viscosity (centipoise)[1] | | | | | |
|---|---|---|---|---|---|---|---|
| | | 0.1 percent | | 0.5 percent | | 1.0 percent | |
| Additive | Hydrolyzed (percent) | Fresh | Aged 24 hrs. | Fresh | Aged 24 hrs. | Fresh | Aged 24 hrs. |
| Polyvinyl alcohol[2] 125............... | +99 | | | | | 750 | ............... |
| Polyvinyl alcohol 165............... | +99 | | | | | 1,550 | ............... |
| Polyvinyl alcohol 325............... | 97–98 | 325 | 300 | 2,400 | 2,210 | 4,410 | 4,275 |
| Polyvinyl alcohol 350............... | 97–98 | 350 | 300 | 2,050 | 2,410 | 3,320 | 4,125 |
| Polyvinyl pyrrolidone[3]............ | | 2,150 | 2,400 | >10,000 | ............... | >10,000 | ............... |

[1] Viscosity of adhesive with no thickener = 140 cps. All measurement with Brookfield viscometer at 60 rpm with No. 4 spindle.
[2] Numbers are viscosity grades of polyvinyl alcohol produced by Air Reduction Corp.
[3] Polyvinyl pyrrolidone added as a 45% solution.

EXAMPLE 10

A desirable adhesive formulation was prepared as follows: Three hundred pounds of ethylene polymer dispersion obtained as a composite of several lots made by Procedure A had a viscosity of 1,250 cps (Brookfield, spindle No. 4, 60 rpm) and a solids content of 24.1 percent. To this was added 76.3 lbs. of butyl rubber latex at 63.3 percent solids. The calculated solids content of the blend was 32.0 percent. Of the solids, 60 percent was ethylene polymer and 40 percent butyl rubber.

The viscosity of an adhesive, prepared in this manner, although quite low for some applications, may be reduced even further by dilution. However, for many applications it is desirable to increase viscosity. For this reason a number of water soluble thickening agents were evaluated, employing an adhesive formulation of

EXAMPLE 11

In the lamination of thin foils, and particularly in lamination to cheaper stocks having surface irregularities, it is necessary to maintain a certain minimum thickness in the layer of laminating adhesive so as to prevent paper texture from showing through the foil. As an aid in maintaining a rather thick coating of adhesive, the adhesive formulations may contain a large proportion of a finely divided solid filler. Inert argillaceous solids, being very cheap, are preferred as fillers. For example, kaolinite, in pulverized form as the washed and dried, or predispersed product may be used. Resin-treated, neutral kaolinite which has reduced hydrophilic properties, as disclosed, for instance, in British Pat. No. 867,752 is especially to be preferred since it yields a useful product with longer shelf life.

Below are tabulated results obtained with laminating adhesives of various ethylene polymer to elastomer ratios and various solids contents, in which 50 per cent of the solids content in each formulation was a predispersed or resin treated clay. The predispersed clay was essentially a kaolinite of controlled particle size treated with a surface active agent to make it more easily dispersible in water.

Effect of Inert Argillaceous Filler

| Ethylene polymer | Butyl rubber | Total solids (percent) | Wet tack | Dry adhesion | Wet adhesion |
|---|---|---|---|---|---|
| (Predispersed clay as 50% of total solids): | | | | | |
| (Procedure A, polymer dispersion) | 60/40 | 46 | No paper tear | 100% paper failure | Good. |
| (Procedure A, polymer dispersion) | 50/50 | 50 | Slight paper tear | do | Do. |
| (Procedure A, polymer dispersion) | 40/60 | 54 | Deep paper tear | do | Do. |
| (Procedure E, polymer dispersion) | 40/60 | 54 | ......do | do | Do. |
| (Resin-treated clay, 50% of total solids): | | | | | |
| (Procedure A, polymer dispersion) | 40/60 | 54 | ......do | do | Do. |

In the clay-filled formulations in which total polymer solids is only 20 to 30 percent (total solids, 40–60 percent), some deterioration in wet tack occurs. This is easily overcome by increasing the proportion of elastomer in total polymer solids and by employing a higher percentage of total solids. Other inert solid fillers such as titania, alumina, and silica may be employed to modify the bulk, stiffness, and other properties of the final dry adhesive layer, if desired.

In this discussion emphasis has been placed on obtaining the greatest wet tack and the best possible strength in the final adhesive bond. It will be understood that in some applications, in which, for instance, a porous web is bonded to each side of a metal foil, it may be dsirable to have one of the final adhesive bonds considerably weaker than the other. A specific example of such a product is a foil-surfaced paper wall covering. In a product of this type one web is removed by dampening, immediately after application to the wall, serving only as a temporary protecting layer during transportation, storage, and handling, as well as a strengthening support during application to the wall. For such a temporary lamination good wet tack and dry adhesion are desirable, but the wet adhesion of the final bond should be poor. For other purposes it may be desirable to emphasize other adhesive properties. Many possible variations are readily apparent on examination of the tabulated data and are easily accomplished by those possessing skill in the art, without departing from the spirit and scope of the invention.

What is claimed is:

1. A blend comprising from about 20 to about 90 percent by weight of an elastomeric polymer of at least one monomer selected from the group consisting of isobutylene, butadiene, chloroprene and isoprene with, complimentary to total 100 percent, from about 90 to about 20 percent by weight of an ethylene polymer containing therein recurring units represented by the following structures:

a. $-CH_2-CH_2-$ (b) 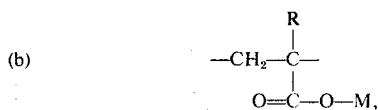

optionally units of the structure (c) 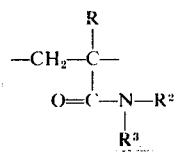

and/or (d) 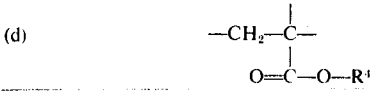

where R is selected from hydrogen and alkyl substituents, M is a cation, $R^2$ and $R^3$ are independently selected from the group consisting of hydrogen, hydroxyalkyl, and hydrocarbon groups with the further provision that $R^2$ and $R^3$ may be combined with N in a heterocyclic group, and $R^4$ is a hydrocarbon group, said units of the formulas (b), (c) and (d) being present in a ratio of from about 0.01 to about 0.50 mol per mol of unit (a).

2. A blend comprising from about 20 to about 90 percent by weight of an elastomeric polymer of at least one monomer selected from the group consisting of isobutylene, butadiene, chloroprene and isoprene with, complimentary to total 100 percent, from about 90 to about 20 percent by weight of an ethylene polymer containing therein recurring units represented by the following structures:

a. $-CH_2-CH_2-$ (b) 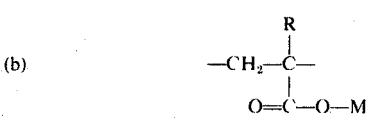

(c) 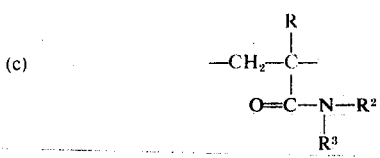

(d) 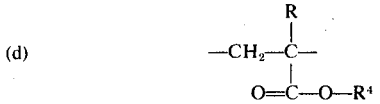

where R is selected from hydrogen and alkyl substituents, M is a cation, $R^2$ and $R^3$ are independently selected from the group consisting of hydrogen, hydroxyalkyl, and hydrocarbon groups with the further provision that $R^2$ and $R^3$ may be combined with N in a heterocyclic group, and $R^4$ is a hydrocarbon group, said units of the formulas (b), (c) and (d) being present in a ratio of from about 0.01 to about 0.50 mol per mol of unit (a).

3. A composition of claim 1, wherein R is hydrogen, M is selected from the group consisting of sodium and potassium ions, $R^2$ and $R^3$ are hydrogen and $R^4$ is a methyl group.

4. A composition of claim 2, wherein R is hydrogen, M is selected from the group consisting of sodium and potassium ions, $R^2$ and $R^3$ are hydrogen, and $R^4$ is a methyl group.

5. A composition of claim 3 wherein said elastomeric polymer is selected from the group consisting of isobutyleneisoprene copolymer, polychloroprene, natural rubber, butadienestyrene copolymer and butadiene-acrylonitrile copolymer.

6. A composition of claim 4, wherein said elastomeric polymer is selected from the group consisting of isobutylenestyrene copolymer, polychloroprene, natural rubber, butadienestyrene copolymer and butadiene-acrylonitrile copolymer. butadiene-acrylonitrile, copolymer.

7. A blend consisting essentially of from about 20 to about 90 percent by weight of an elastomer which is natural rubber, butadiene/sytrene copolymer, butyl rubber polyisoprene, or butadiene/acrylonitrile copolymer with, complimentary to total 100 percent, from about 90 to about 20 percent by weight of an ethylene polymer containing therein recurring units represented by the following structures:

(a)             —CH$_2$—CH$_2$—

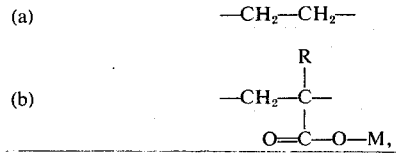

optionally units of the structure

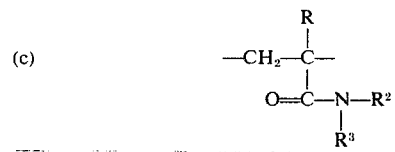

and/or

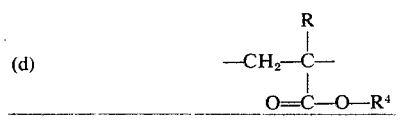

where R is selected from hydrogen and alkyl substituents, M is a cation, $R^2$ and $R^3$ are independently selected from the group consisting of hydrogen, hydroxyalkyl, and hydrocarbon groups with the further provision that $R^2$ and $R^3$ may be combined with N in a heterocyclic group, and $R^4$ is a hydrocarbon group, said units of the formulas (b), (c) and (d) being present in a ratio of from about 0.01 to about 0.50 mol per mol of unit (a).

8. An article of manufacture comprising a metal bearing on at least one surface thereof a composition of claim 1.

9. An article of manufacture comprising a fibrous web bearing on at least one surface thereof a composition of claim 1.

10. The article of manufacture of claim 9 wherein said fibrous web comprises paper.

11. The article of manufacture of claim 9 wherein said metal is aluminum.

12. A laminated structure comprising a metal layer bonded to a fibrous web employing a composition of claim 1.

13. The laminated structure of claim 12 wherein said metal layer is aluminum and wherein said fibrous web is paper.

14. An aqueous adhesive composition having high wet tack when used to bond paper to aluminum foil which comprises a blend of (1) a stable aqueous dispersion of an ethylene polymer containing therein recurring units represented by the following structures:

(a)             —CH$_2$—CH$_2$—

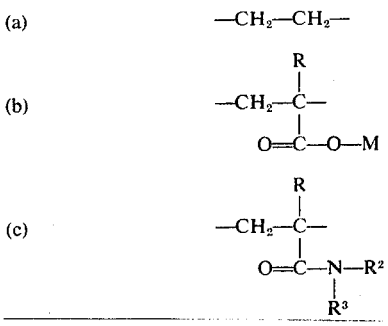

wherein R is selected from hydrogen and alkyl substituents, M is selected from the group consisting of sodium and potassium, $R^2$ and $R^3$ is hydrogen, said groups of the formulas (b) and (c) being present in a ratio of from about 0.01 to about 0.5 mol per mol of group (a), said aqueous dispersion being substantially free of emulsifying or dispersing agents, and (2) a stable latex of an elastomeric polymer of at least one monomer selected from the group consisting of isobutylene, butadiene, chloroprene and isoprene, said aqueous dispersion of ethylene polymer and said latex of an elastomer being blended in such proportions that the elastomeric polymer constitutes from about 20 to about 90 percent by weight of the total polymer solids.

15. A composition of claim 14 in which the elastomeric polymer is selected from the group consisting of isobutyleneisoprene copolymers, polychloroprene, natural rubber, butadienestyrene copolymers and butadiene-acrylonitrile copolymers.

16. An aqueous adhesive composition having high wet tack when used to bond paper to aluminum foil which comprises a blend of (1) a stable aqueous dispersion of an ethylene polymer containing therein recurring units represented by the following structures:

(a)             —CH$_2$—CH$_2$—

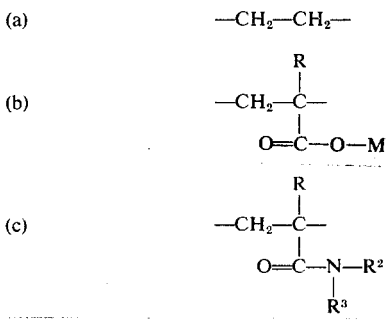

wherein R is selected from hydrogen and alkyl substituents, M is selected from the group consisting of hydrogen, sodium and potassium, at least a portion of group (b) being in the potassium or sodium salt form, $R^2$ and $R^3$ are hydrogen, said groups of the formulas (b) and (c) being present in a ratio of from about 0.01 to about 0.5 mol per mol of group (a), said aqueous dispersion being substantially free of emulsifying or dispersing agents, and (2) a stable latex of an elastomeric polymer of at least one monomer selected from the group consisting of isobutylene, butadiene, chloroprene and isoprene, said aqueous dispersion of ethylene polymer and said latex of an elastomer being blended in such proportions that the elastomeric polymer constitutes from about 20 to about 90 percent by weight of the total polymer solids.

17. An aqueous adhesive composition having high wet tack when used to bond paper to aluminum foil which comprises a blend of (1) a stable aqueous dispersion of an ethylene polymer containing therein recurring units represented by the following structures:

(a) 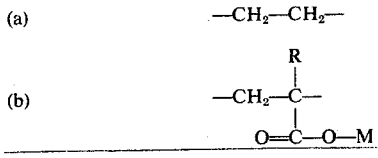
(b)

wherein R is selected from hydrogen and alkyl substituents, M is selected from the group consisting of sodium and potassium, said groups of the formula (b) being present in a ratio of from 0.01 to about 0.5 mol per mol of group (a), said aqueous dispersion being substantially free of emulsifying or dispersing agents, and (2) a stable latex of an elastomeric polymer of at least one monomer selected from the group consisting of isobutylene, butadiene, chloroprene and isoprene, said aqueous dispersion of ethylene polymer and said latex of an elastomer being blended in such proportions that the elastomeric polymer constitutes from about 20 to about 90 percent by weight of the total polymer solids.

18. An aqueous adhesive composition having high wet tack when used to bond paper to aluminum foil which comprises a blend of (1) a stable aqueous dispersion of an ethylene polymer containing therein recurring units represented by the following structures:

(a) 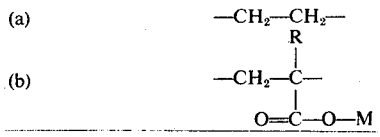
(b)

wherein R is selected from hydrogen and alkyl substituents, M is selected from the group consisting of hydrogen, sodium and potassium, at least a portion of group (b) being in potassium or sodium salt form, said groups of the formula (b) being present in a ratio of from 0.01 to about 0.5 mol per mol of group (a), said aqueous dispersion being substantially free of emulsifying or dispersing agents, and (2) a stable latex of an elastomeric polymer of at least one monomer selected from the group consisting of isobutylene, butadiene, chloroprene and isoprene, said aqueous dispersion of ethylene polymer and said latex of an elastomer being blended in such proportions that the elastomeric polymer constitutes from about 20 to about 90 percent by weight of the total polymer solids.

* * * * *